United States Patent [19]

Steffens

[11] Patent Number: 5,320,744

[45] Date of Patent: Jun. 14, 1994

[54] POSITIVE EVACUATION OF FCCU REACTOR DILUTE PHASE VOLUME

[75] Inventor: Todd R. Steffens, Randolph, N.J.

[73] Assignee: Exxon Research & Engineering Co., Florham Park, N.J.

[21] Appl. No.: 992,948

[22] Filed: Dec. 14, 1992

[51] Int. Cl.5 .............................................. C10G 11/00
[52] U.S. Cl. ..................................... 208/113; 208/146
[58] Field of Search ................................ 208/146, 113

[56] References Cited

U.S. PATENT DOCUMENTS

| | | | |
|---|---|---|---|
| 3,152,066 | 10/1964 | Wickham | 208/163 |
| 4,394,349 | 7/1983 | Cartmell | 422/147 |
| 4,446,107 | 5/1984 | Buyan et al. | 422/107 |
| 4,502,947 | 3/1985 | Haddad et al. | 208/161 |
| 4,606,814 | 8/1986 | Haddad et al. | 208/161 |
| 4,623,446 | 11/1986 | Haddad et al. | 208/113 |
| 4,654,060 | 3/1987 | Haddad et al. | 55/424 |
| 4,737,346 | 4/1988 | Haddad et al. | 422/144 |
| 4,778,660 | 10/1988 | Haddad et al. | 422/144 |
| 4,853,187 | 8/1989 | Herbst et al. | 422/144 |
| 4,909,993 | 3/1990 | Haddad et al. | 422/144 |
| 4,946,656 | 8/1990 | Ross et al. | 422/144 |
| 5,158,668 | 10/1992 | Cetinkaya | 208/113 |

*Primary Examiner*—David B. Springer
*Attorney, Agent, or Firm*—Joseph J. Dvorak

[57] ABSTRACT

In its simplest sense, the present invention provides a uniquely shaped conduit between the primary and secondary cyclones or, in the alternative, between the riser and the primary cyclone, which creates an increase in the suction of the dilute phase vapor beyond that normally available in the reactor vessel, thereby reducing the dilute phase residence time in the vessel, reducing post-riser thermal cracking, hydrogen transfer reactions, and coking tendency of mixture in dilute phase.

6 Claims, 3 Drawing Sheets

POSITIVE EVACUATION OF FCCU REACTOR DILUTE PHASE VOLUME

FIELD OF THE INVENTION

The present invention relates to improvements in the separation of catalyst particles from the gaseous phase in a fluid cat cracking unit.

BACKGROUND OF THE INVENTION

The trend in the field of catalytic cracking, and particularly in fluid catalytic cracking (FCC), has been to employ high activity catalysts and operate the catalytic cracking process at increasing temperature regimes; for example, at temperatures in the range of about 525° C. to about 555° C. This has necessitated the rapid separation of catalyst from hydrocarbons being converted in the fluid catalytic cracking reactor in order to reduce the contact time of the catalyst with the hydrocarbon products, thereby preventing undesirable excessive cracking of the products in the contacting zone with the concomitant deposition of carbon on the catalyst particles. One method employed in reducing the contact time of the catalyst with the hydrocarbon products involves transferring suspended catalyst and hydrocarbon upwardly through a riser conversion zone (FCC cracking zones) and feeding the catalyst particles suspended in the gaseous phase into a cyclone system attached to the riser. Examples of such systems can be found in U.S. Pat. No. 4,778,660, U.S. Pat. No. 4,606,814, U.S. Pat. No. 4,909,993, U.S. Pat. No. 4,654,060, U.S. Pat. No. 4,502,947, U.S. Pat. No. 4,737,346 and U.S. Pat. No. 4,623,446.

Alternatively, systems have been proposed in which the riser and cyclone are open to a dilute phase zone in the FCC vessel. Examples of this type of system include U.S. Pat. No. 3,152,066, U.S. Pat. No. 4,394,349, U.S. Pat. No. 4,446,107 and U.S. Pat. No. 4,946,656.

Notwithstanding the many techniques employed for separating FCC products from catalyst, a need continues to exist for developing new and more efficient systems for decreasing the contact time of hydrocarbon vapor products and catalyst in fluid catalytic cracking vessels. This need is particularly important as the industry shifts toward using heavier feedstocks in process units running at higher temperatures and employing more active catalysts.

An object of the present invention is to provide a process and apparatus to reduce residence time of hydrocarbon conversion products in a fluid catalytic cracking reactor vessel.

It is a further object of the present invention to use the energy of the riser discharge or, in the alternative, the riser cyclone discharge, to actively assist in removing the vapor from the dilute phase in the reactor vessel.

Other objects of the present invention will become apparent upon reading the "Detailed Description of the Invention".

SUMMARY OF THE INVENTION

In its simplest sense, the present invention provides a uniquely shaped conduit between the primary and secondary cyclones or, in the alternative, between the riser and the primary cyclone, which creates an increase in the suction of the dilute phase vapor beyond that normally available in the reactor vessel, thereby reducing the dilute phase residence time in the vessel, post-riser thermal cracking and hydrogen transfer reactions.

DETAILED DESCRIPTION OF THE INVENTION

Figure 1:
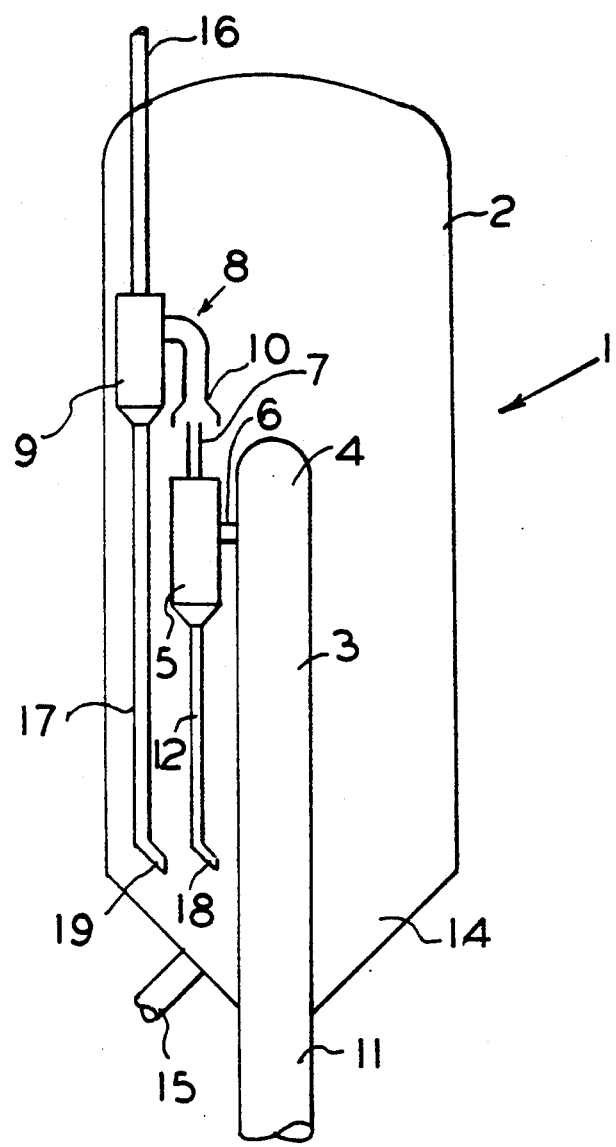
FIG. 1 is a schematic illustration of the fluid catalytic cracking reactor system of an embodiment of the present invention, having a riser in close communication with a primary cyclone and including means between the primary and secondary cyclones to increase the suction of dilute phase vapor.

As is shown in FIG. 1, the present invention employs a generally vertical reactor vessel 1 having sidewalls 2 and a centrally positioned riser 3 having a downstream end 4 located within the reactor vessel 1. The riser downstream end 4 is in communication with a primary cyclone 5 via riser discharge conduit 6. The outlet conduit 7 of primary cyclone 5 is in communication with the inlet of the secondary cyclone 9. Inlet conduit 8 of secondary cyclone 9 is equipped at its first end 10 with a unique venturi shaped section.

As can be seen in FIG. 1, the downstream end 4 of riser 3 is closed, except for the opening in the sidewall for communication with conduit 6. The upstream end 11 of riser 3 communicates with means (not shown) for introducing catalyst and hydrocarbon into the riser 3.

Also shown in FIG. 1 is the outlet conduit 16 which is operably connected to secondary cyclone 9 for removing the overhead gas from the cyclone 9; a conduit 15 is provided for removal of stripped catalyst.

Primary cyclone 5 has a dipleg 12 and secondary cyclone 9 has a dipleg 17 terminating in trickle valves 18 and 19, respectively. The catalyst separated from the vapor in the cyclones 5 and 9 are discharged via the trickle valves 18 and 19, respectively, into the catalyst stripping zone 14.

Figure 2:
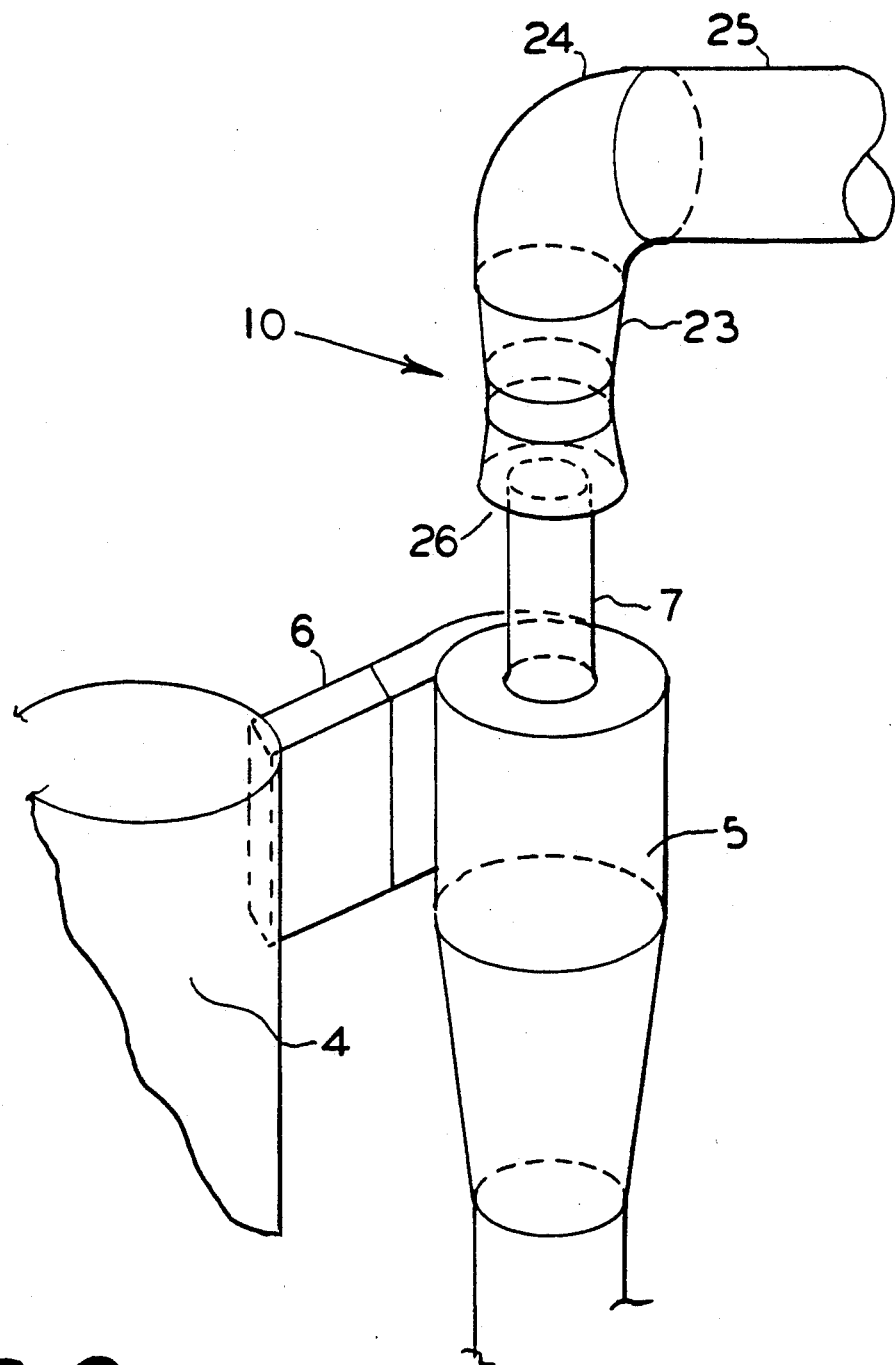
FIG. 2 is a detailed illustration of the conduit of the present invention between the primary cyclone and the secondary cyclone.

An important feature of the embodiment of the invention shown in FIG. 1 is the shape at the first end 10 of the inlet conduit 8 of the secondary cyclone 9. This feature is shown in detail in FIG. 2. Basically, the first end 10 has a frustoconical bottom section 21, a generally cylindrical midsection 22 and an inverted frustoconical top section 23. As can be seen in FIG. 2, the diameter of the circular opening 26, i.e., the diameter of the base of section 21, is larger than the opening of the conduit 7. This permits conduit 7 to be inserted slightly into the first end 10 of conduit 8 and yet provide an annular port defined by conduit 7 and section 21 which is in open communication with the interior of the vessel 1. The central or throat section 22 has a diameter which is less than the diameter of the base opening 26 of section 21; however, the ratio of the area of the opening 22 to the area of the opening of conduit 7 in general will be between about 1.2 to about 2.5.

As can be seen i n FIG. 2, the top port i on 23 extends upwardly from the throat section 22 and is operably connected to an elbow 24 which, in turn, is connected to section 25. Section 25 is, of course, in operable communication with the inlet of cyclone 9.

Figure 3:
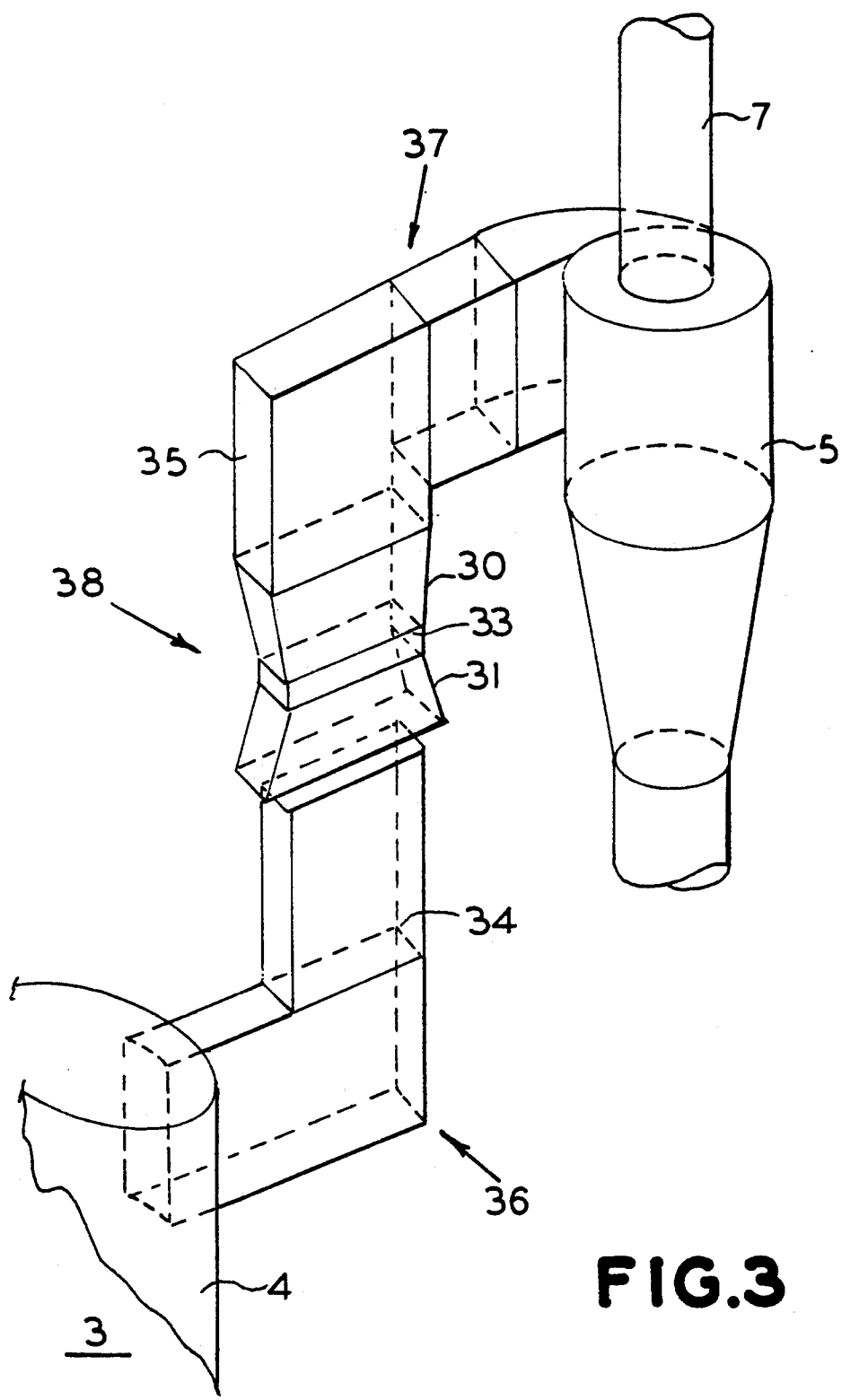
FIG. 3 is a detailed illustration of another embodiment of the invention, wherein a uniquely shaped conduit is provided between the primary cyclone and the riser.

In an alternate embodiment of the present invention, shown in FIG. 3, the primary cyclone 5 is in operable communication with the downstream end 4 of riser 3 by means of a riser outlet conduit 36 and a cyclone inlet conduit 37 having a venturi shaped first end 38. As is shown in FIG. 3, the conduits 36 and 37 are generally rectangular in shape; however, circular conduits are equally suitable. The important feature of this embodiment resides in the venturi shape of the first end 38 of conduit 37, which is in open communication with the riser outlet conduit 36 and the dilute phase within reactor vessel 1.

Thus, as is shown in FIG. 3, the first end 38 of conduit 37 has a trapezoidal bottom section 31 and a trapezoidal top section 32 defining a rectangular throat section 33, where the top and bottom sections, 32 and 31, respectively, join. Conduit 36 has an upwardly extending end section 34, which is in communication with section 31 of conduit 37. Indeed, the base of section 31 is sufficiently large that section 34 can extend upwardly into section 31 and still leave a peripheral opening, permitting communication of the dilute phase in the vessel 1 with conduit 37. Finally, conduit 37 has a generally midsection 35 connected to the first end 38 and which opens into the inlet of cyclone 5.

The ratio of the cross area of the opening of section 33 to the area of the opening of 34 is the same as that when the venturi section is circular in cross section, i.e. in the range of about 1.2 to about 2.5.

In the method of the invention, hydrocarbon catalyst particles are introduced into the riser 3 which terminates within the reactor vessel 1. The cracked hydrocarbon and suspended catalyst particles then pass through conduit 6 into cyclone 5, which separates a considerable portion of the catalyst particles from the hydrocarbon vapor. In the embodiment shown in FIGS. 1 and 2, the conduit 6 is closed to the interior of vessel 1, so that no stripping gas from the reactor vessel 1 enters therein. After separation in the cyclone, the fluidized gaseous material exiting the cyclone passes through the outlet conduit 7 and into the secondary cyclone inlet conduit 8. Because of the shape of the first end 10 of conduit 8, materials within the vessel are aspirated or sucked into the conduit 8, thereby reducing the amount of material therein in vessel 1 that is in contact with the catalyst.

In the embodiment shown in FIG. 3, the principal of operation is substantially the same; however, there is an opening between conduit 36 and conduit 37 which also is a venturi shape and results in sucking in of material from the atmosphere in vessel 1.

A key advantage of the present invention is that the energy of the materials discharged from the riser or from the primary cyclone as the case may be, is used to actively assist in removing vapor from the dilute phase in the reactor vessel 1.

Another significant feature of the present invention is that it permits retrofitting existing cyclone systems with minimum expense and reactor downtime. Other advantages should be apparent to one skilled in the art.

While the specific embodiments of the method and apparatus of the present invention have been shown and described, it should be also apparent that many modifications can be made thereto without departing from the spirit and scope of the invention. Accordingly, the invention is not limited by the foregoing description, but it is only limited by the scope of the claims appended hereto.

What is claimed is:

1. In a fluid catalytic cracking apparatus having a vertical riser reactor with a second end located in a vessel, the second end of the riser being in communication with primary and secondary cyclones also located within the vessel, the communication being via riser conduits between the riser and each primary cyclone and via cyclone conduits between each primary and secondary cyclone, the improvement comprising:

providing the riser conduits or the cyclone conduits with a venturi shaped section having a first end and a second end, the venturi shaped section at its first end being in open communication with the interior of the vessel, and when the riser conduits are provided with the venturi shaped section, the first end also is in open communication at its first end with the riser, and when the cyclone conduits are provided with the venturi shaped section, the first end also is in open communication at its first end with the primary cyclone.

2. The improvement of claim 1 wherein the venturi shaped section is between the riser and the primary cyclone.

3. The improvement of claim 1 wherein the venturi shaped section is between the primary and secondary cyclone.

4. The improvement of claims 2 and 3 were in the venturi shape section has a tubular first end, a cylindrical mid section and a tubular second end, the tubular first end tapering downwardly and outwardly from the cylindrical midsection and the tubular second end tapering upwardly and outwardly from the cylindrical midsection.

5. The improvement of claims 2 or 3 wherein the venturi shaped section has a trapezoidal first end, a rectangular midsection and an inverted trapezoidal second end.

6. In the method of fluid catalytic cracking of hydrocarbon feed wherein a suspension of hydrocarbon feed and catalyst is passed through a riser conversion zone contained within a reactor vessel for cracking of the hydrocarbon feed in a riser conversion zone, and the suspension is then passed from a riser conversion zone to a primary cyclone positioned within the reactor vessel for separation of solids therefrom and to provide an effluent stream which is then passed through a secondary cyclone positioned within the vessel for further separation of solids therefrom, the improvement comprising:

passing the suspension from the riser conversion zone or the effluent from the primary cyclone through a venturi which is in open communication with the interior of the reaction vessel, whereby catalyst solids suspended in the hydrocarbon vessel are aspirated into the conduit and passed to the cyclone for separation therein.

* * * * *